(12) United States Patent
Morgan

(10) Patent No.: US 6,362,828 B1
(45) Date of Patent: Mar. 26, 2002

(54) METHOD AND SYSTEM FOR DYNAMIC TEXTURE REPLICATION ON A DISTRIBUTED MEMORY GRAPHICS ARCHITECTURE

(75) Inventor: David L. Morgan, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/344,005

(22) Filed: Jun. 24, 1999

(51) Int. Cl.[7] ............................................. G06T 11/40
(52) U.S. Cl. ........................ 345/582; 345/587; 345/611
(58) Field of Search ................................. 345/430, 422, 345/515, 521, 531, 572, 501, 582, 583, 584, 585, 586, 587, 611, 614, 588, 613, 653

(56) References Cited

U.S. PATENT DOCUMENTS

| | | | | |
|---|---|---|---|---|
| 5,760,783 A | * | 6/1998 | Migdal et al. | 345/430 |
| 5,767,858 A | * | 6/1998 | Kawase et al. | 345/430 |
| 5,801,708 A | * | 9/1998 | Alcorn et al. | 345/430 |
| 5,844,571 A | * | 12/1998 | Narayanaswam | 345/422 |
| 5,844,576 A | * | 12/1998 | Wilde et al. | 345/544 |
| 5,877,771 A | * | 3/1999 | Drebin et al. | 345/430 |
| 5,943,058 A | * | 8/1999 | Nagy | 345/430 |
| 6,005,582 A | * | 12/1999 | Gabriel et al. | 345/430 |
| 6,104,415 A | * | 8/2000 | Gossett | 345/552 |

* cited by examiner

*Primary Examiner*—Matthew Luu
*Assistant Examiner*—Thu-Thao Havan
(74) *Attorney, Agent, or Firm*—Woodcock Washburn LLP (57) ABSTRACT

In a graphics subsystem of a computer system, a method for adjustable texture replication. The method is implemented within the graphics subsystem of the computer system. The method includes the step of configuring a plurality of raster engines into a first cluster and a second cluster. The raster engines of the first cluster and the raster engines of the second cluster are each communicatively coupled to respective texture memories. A first texture image copy is stored among the texture memories of the first cluster such that each respective texture memory stores a respective portion of the first texture image copy. A second texture image copy is stored among the texture memories of the second cluster such that each respective texture memory stores a respective portion of the second texture image copy. A parallel texture mapping process is performed on a surface using the first cluster and the second cluster. The first cluster texture maps the first texture image copy, wherein the plurality of raster engines of the first cluster share access to the each respective texture memory storing the first texture image copy. The second cluster texture maps the second texture image copy, wherein the plurality of raster engines of the second cluster share access to each respective memory storing the second image copy. The number of clusters, and the number of raster engines within the clusters, is adjustable to implement variable texture replication.

18 Claims, 7 Drawing Sheets

METHOD AND SYSTEM FOR DYNAMIC TEXTURE REPLICATION ON A DISTRIBUTED MEMORY GRAPHICS ARCHITECTURE

FIELD OF THE INVENTION

The field of the present invention pertains to computer implemented graphics. More particularly, the present invention relates to a system and method for implementing variable texture replication in a graphics subsystem.

BACKGROUND OF THE INVENTION

Computer graphics are being used today to perform a wide variety of tasks. Many different areas of business, industry, government, education, entertainment, and most recently, the home, are tapping into the enormous and rapidly growing list of applications developed for today's increasingly powerful computer devices.

Graphics have also become a key technology for communicating ideas, data, and trends in most areas of commerce, science, and education. Modern graphics workstations often implement real time user interaction with three dimensional (3D) models and pseudo-realistic images. These workstations typically contain dedicated, special purpose graphics hardware. The progress of semiconductor fabrication technology has made it possible to do real time 3D animation, with color shaded images of complex objects, described by thousands of polygons, on powerful dedicated rendering subsystems. The most recent and most powerful workstations are capable of rendering completely life-like, realistically lighted, 3D objects and structures.

In a typical 3D computer generated object, the surfaces of the 3D object are described by data models. These data models store "primitives" (usually mathematically described polygons and polyhedra) that define the shape of the object, the object attributes, and the connectivity and positioning data describing how the objects fit together. The component polygons and polyhedra connect at common edges defined in terms of common vertices and enclosed volumes. The polygons are textured, Z-buffered, and shaded onto an array of pixels, creating a realistic 3D image.

In a typical graphics computer, most of the actual rendering computation is performed by a graphics subsystem included in the graphics computer. The 3D object data models are "traversed" by a software program (e.g., in response to user input) running on one or more processors in a processor subsystem within the graphics computer. The primitives describing the 3D object are processed by the processor subsystem and sent to the graphics subsystem for rendering. For example, a 3D polyhedra model of an object is sent to the graphics subsystem as contiguous strips of polygons, sent to the graphics subsystem as a graphics data stream (e.g., primitives, rendering commands, instructions, etc.). This graphics data stream provides the graphics subsystem with all the information required to render the 3D object and the resulting scene. Such information includes, for example, specular highlighting, anti-aliasing, depth, transparency, and the like. Using this information, the graphics subsystem performs all the computational processing required to realistically render the 3D object. The hardware of the graphics subsystem is specially tuned to perform such processing quickly and efficiently in comparison to the processor subsystem.

Texture mapping is an important part of the 3D rendering process. In order to portray a more realistic real-world representation, texture mapping is usually applied to the 3D objects of the scene during rendering. Texture mapping refers to techniques for using multi-dimensional (e.g., 2D, 3D, etc.) texture images, or texture maps, for adding surface details to areas or surfaces of these 3D graphical objects. For example, given a featureless solid cube and a texture map defining a wood grain pattern, texture mapping techniques may be used to map the wood grain pattern onto the cube. The resulting image is that of a cube that appears to be made of wood. In another example, vegetation and trees can be added by texture mapping to an otherwise barren terrain model in order to portray a landscape filled with vegetation and trees.

Texture mapping is typically implemented during rasterization steps of the rendering process. For example, during rasterization, a texture element, or texel, is generated from a stored texture image (e.g., within a texture memory) and applied to each fragment of a particular surface. The individual texels represent the color of the texture image to be applied to respective corresponding fragments. A texture mapping process maps a portion of the specified texture image onto each primitive. Texture mapping is accomplished by using the color of the texture image at the location, for example, by overwriting or modifying the fragment's RGBA (Red, Green, Blue, Alpha) color.

The performance of the texture mapping process is highly dependent upon the performance of the underlying hardware. High performance texture mapping requires high power, high bandwidth rendering hardware within the graphics subsystems. One technique for accomplishing this is "pipelining" the graphics subsystem.

In a pipelined architecture, the graphics subsystem is configured as a series of interconnected stages used to render an image. Each stage performs a unique task during each clock cycle, for example, where one stage might be used to scan-convert a pixel; a subsequent stage may be used for color conversion; another stage could be used to perform depth comparisons; this is followed by a texture stage for texturing; etc. The advantage of using a pipelined architecture is that as soon as one stage has completed its task on a pixel, that stage can immediately proceed to work on the next pixel without having to wait for the processing of a prior pixel to complete. Accordingly, pixels flow through the pipeline at a rapid rate.

However, one drawback of a pipelined architecture is that since each stage performs a unique function, the stages are typically constructed from specialized circuit designs. And even though a single pipeline architecture often entails the use of hundreds of such stages, there still exists a finite limit to the speed at which graphics data can proceed through the pipeline.

A more modern architecture involves the use of parallel rendering hardware within the graphics subsystem. To increase performance (e.g., texture mapping speed), rendering components (i.e. multiple sub-pipelines) are implemented to process graphics data in parallel to increase the total aggregate speed of the graphics subsystem. Such a parallel processing environment allows the rendering process to be apportioned among a series of parallel rendering components to achieve a much faster peak performance than possible in the more conventional pipelined architecture. Hence, the most modern graphics subsystem architectures are implemented as parallel processing environments.

With respect to high performance texture mapping, in such a parallel processing environment, a graphics subsystem would typically include multiple parallel "geometry engines" coupled to multiple parallel raster engines. Each geometry engine performs geometry processing on, for example, a specific portion of an image, and sends the resulting graphics data to a corresponding raster engine for fragment processing (e.g., texture mapping, antialiasing, rasterization, etc.). The texture mapping processing is performed in parallel.

However, parallel processing within the graphics subsystem leads to other types of problems. To perform texture mapping in such a parallel environment, each raster engine may need to maintain a copy of the texture (e.g., texels of a texture image). This is required in order to ensure the raster engine is not starved for texture data, as, for example, in a case where raster engines contend for access to a texture map stored in a single shared memory.

One solution is to have large texture memories for every raster engine to accommodate very large textures. The problem with this solution is that it is very expensive. A high performance parallel rendering subsystem requires large texture memories for each raster engine, so that each raster engine has fast access to its own complete copy of the texture image. This implementation is referred to as "statically replicated" or "fully replicated" textures, which refers to keeping a complete copy of the entire texture image with each raster engine's texture memory.

The problem with statically replicated textures is the fact that it is wasteful of memory. The larger the texture (e.g., size of the array of texels), the larger the dedicated texture memory for each raster engine needs to be. Hence, to efficiently handle applications requiring large textures, the dedicated texture memory needs to be appropriately sized. However, for those applications using medium or small textures, the large texture memories are mostly wasted.

One solution to this problem involves the partitioning of a large texture into respective portions and storing these portions into corresponding raster engines (e.g., the dedicated texture memory coupled thereto). This solution is often referred to as "fully apportioned" texture storage. In such an architecture, the raster engines access their respective coupled texture memory for texture data supporting their respective portion of the texture mapping process. However, if the texture is very large, raster engines usually have to access texels stored in other raster engine's texture memory. This can lead to large amounts of bus traffic.

An important factor determining the amount of bandwidth consumed by texture transactions is texel size. Texel size refers to the number of bits required to represent each texture element in a texture. The texel size is determined by the needs of graphics applications, such as greyscale vs. color, precision needed, tolerability of compression, etc. The smallest texels can be generated using compressed texture algorithms (i.e. 4-bit texels); large texels can be 64-bits or larger.

Multiple texture fetches over the bus/interconnect coupling the raster engines can consume excessive amounts of bandwidth. The problem is worse with large texels. Hence, large textures most suited to use with high performance graphics subsystems typically cause the most bus traffic amongst the parallel raster engines. The large number of fetches can saturate the bus. Even in those architectures which implement cross bar switching for increased data transfer bandwidth, the large number of fetches (especially with uncompressed textures) can saturate the cross bar network. Thus, the more saturated the network becomes, the slower the performance.

Thus, what is required is a method for efficiently handling large textures (large texels e.g., 64 bits) in a parallel processing environment. What is required is a high performance method of supplying texture data to multiple parallel raster engines that does not incur the cost penalties of a full statically replicated texture environment. The required solution should further provide the efficiency of apportioned texture storage amongst parallel raster engines that does not incur the data transfer saturation penalties of texture mapping with large textures. Additionally, because texel size requirements vary from application to application, the solution should be configurable to strike the proper balance between performance and memory utilization. The present invention provides a novel solution to the above requirements.

SUMMARY OF THE INVENTION

The present invention is a method and system for variable texture replication in a parallel graphics subsystem. The method and system of the present invention provides a method for efficiently handling large textures (large texels e.g., 64 bits) in a parallel processing environment. The variable texture replication process of the present invention provides a high performance method of supplying texture data to multiple parallel raster engines that does not incur the cost penalties of a full statically replicated texture environment. In addition, the present invention retains the efficiency aspects of apportioned texture storage amongst parallel raster engines and does not incur the data transfer saturation penalties of texture mapping with large textures/texels.

In one embodiment, the present invention is implemented as an adjustable texture replication process within a parallel processing environment of a graphics subsystem. The graphics subsystem performs the rendering processing for a digital computer system (e.g., a graphics workstation). The process is implemented within the graphics subsystem, and includes the step of configuring a plurality of raster engines (e.g., four parallel raster engines) into at least a first cluster and a second cluster (although a larger numbers clusters can be implemented in more highly parallel environments). The raster engines of the first cluster and the raster engines of the second cluster are each communicatively coupled to respective texture memories. A first texture image copy is stored among the texture memories of the first cluster such that each respective texture memory stores a respective portion of the first texture image copy. A second texture image copy is stored among the texture memories of the second cluster such that each respective texture memory stores a respective portion of the second texture image copy. A parallel texture mapping process is performed on a surface using the first cluster and the second cluster. The first cluster texture maps the first texture image copy, wherein the plurality of raster engines of the first cluster share access to the each respective texture memory storing the first texture image copy. The second cluster texture maps the second texture image copy, wherein the plurality of raster engines of the second cluster share access to each respective memory storing the second image copy.

In this manner, most of the communications traffic between raster engines occurs "within cluster", meaning that fetches of texture data occur amongst raster engines in the same cluster since each cluster stores a complete texture image copy. This aspect greatly reduces the aggregate amount of communications traffic in comparison to that of a prior art "fully apportioned" texture storage scheme. Additionally, a complete texture image copy remains readily available within cluster, without requiring the memory hardware expense associated with prior art "full replication" schemes.

In accordance with the present invention, the number of raster engines included in the first cluster and the number of raster engines included in the second cluster, and the number of clusters themselves, are adjustable to implement variable texture replication. For example, each additional raster engine included in a cluster causes an additional "per-engine" apportionment of the texture image copy, such that each engine in the cluster stores a respective portion of the texture image copy. In addition to increasing or decreasing the number of raster engines included in the first and second clusters, the plurality of raster engines of the graphics subsystem can be further divided into a larger number of clusters, such as, for example, dividing an eight way parallel subsystem into four clusters of two, or dividing a sixteen way parallel subsystem into eight clusters of two or alternatively two clusters of eight. In each case, a complete copy of the texture image is maintained within each cluster (e.g., apportioned among the raster engines of the cluster). This division of the rasterization hardware can be specified by an application in such a way as to best meet that application's needs.

In most graphics systems capable of hardware-accelerated texture mapping, multiple different texture maps may be stored in the texture memory by the application. In a graphics system implementing variable texture replication, not all of the texture memory need be allocated to a single cluster. The addressable texture memory may be divided up into one or more segments, each allocated to a different supercluster (Supercluster meaning the set of all rasterizers, divided up into a particular clustering topology). For example, if the available texture memory is divided into two parts, the first part would map into a fully apportioned supercluster (i.e. textures stored in the first memory segment are divided among all rasterizers), and the second part would map to a half-and-half supercluster (i.e. two copies of texture). This added flexibility allows for finer configuration of the balance between performance and memory usage, as not all textures used by a particular application will have the same texel size.

BRIEF DESCRIPTION OF THE DRAWINGS

The present invention is illustrated by way of example and not by way of limitation, in the Figures of the accompanying drawings and in which like reference numerals refer to similar elements and in which.

DETAILED DESCRIPTION OF THE INVENTION

In the following detailed description of the present invention, a method and system for dynamic texture replication on a distributed memory graphics architecture, numerous specific details are set forth in order to provide a thorough understanding of the present invention. However, it will be obvious to one skilled in the art that the present invention may be practiced without these specific details and on systems which do not fully implement the depicted architectural details. In other instances well known methods, procedures, components, and circuits have not been described in detail as not to unnecessarily obscure aspects of the present invention. It should also be recognized by one skilled in the art that some aspects of the present invention pertain to graphics subsystems, and as such, can apply not only to graphics computers, but to any computer based image generator, such as, for example, a computer implemented image generator having simple controlling hardware and which connects directly to data base memory or a mass storage device.

Some portions of the detailed descriptions which follow are presented in terms of procedures, logic blocks, processing, and other symbolic representations of operations on data bits within a computer system. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical, optical, or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "rendering" or "sending" or "processing" or "executing" or "storing" or the like, refer to the action and processes of a computer system (e.g., computer system 200 of FIG. 2), or similar data processing device, that manipulates and transforms data represented as physical (electronic) quantities within the computer system's registers and memories into other data similarly represented as physical quantities within the computer system memories or registers or other such information storage, transmission or display devices.

The present invention is a method and system for variable texture replication in a parallel graphics subsystem. The method and system of the present invention provides a method for efficiently handling large textures (large texels e.g., 64 bits) in a parallel processing environment. The variable texture replication process of the present invention provides a high performance method of supplying texture data to multiple parallel raster engines that does not incur the cost penalties of a full statically replicated texture environment. In addition, the present invention retains the efficiency aspects of apportioned texture storage amongst parallel raster engines and does not necessarily incur the data transfer saturation penalties of texture mapping with large textures in a fully apportioned system. The present invention and its benefits are further described below.

Figure 1:
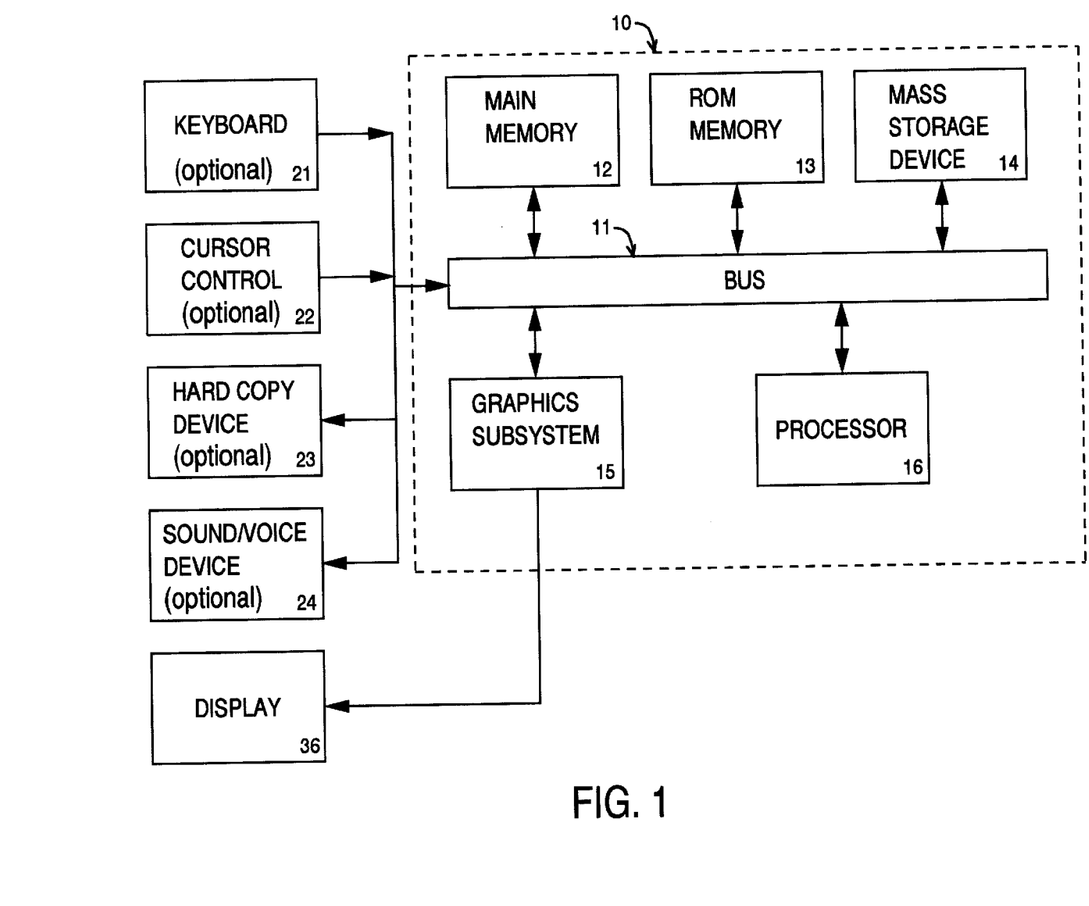
FIG. 1 shows a diagram of a basic computer system in accordance with one embodiment the present invention.

Referring now to FIG. 1, a diagram of a 3D graphics computer system 10 in accordance with one embodiment of the present invention is shown. Computer system 10 depicts a basic implementation of a computer system in accordance with the present invention. Computer system 10 includes a bus 11 for transmitting digital information between the various parts of the computer system. One or more microprocessors 16 are coupled to bus 11 for processing information. The information along with the instructions of how the information is to be processed are stored in a hierarchical memory system comprised of mass storage device 14, read only memory 13, and main memory 12. Mass storage device 14 is used to store large amounts of digital data. The mass storage device 14 can consist one or more hard disk drives, floppy disk drives, optical disk drives, tape drives, CD ROM drives, or any number of other types of storage devices having media for storing data digitally. A read only memory (ROM) 13 is used to store digital data of a permanent basis, such as instructions for the microprocessors. Main memory 12 is used for storing digital data on an intermediate basis. Main memory 12 can be dynamic random access memory (DRAM).

Computer system 10 includes a 3D graphics rendering subsystem 15. Processor 16 provides the graphics subsystem 15 with graphics data, such as drawing commands, coordinate vertex data, and other data related to an object's geometric position, color, texture, shading, and other surface parameters. As with typical graphics subsystems, the object data is processed by graphics subsystem 15 in multiple stages (e.g., geometry processing, rasterization/scan conversion, etc.). Image information is output from graphics subsystem 15 for viewing on display 36.

Several other optional devices may also be coupled to system 10. For example, an alphanumeric keyboard 21 is used for inputting commands and other information to processor 16. Another type of user input device is cursor control device 22 (a mouse, trackball, joystick, and the like) used for positioning a movable cursor and selecting objects on a computer screen. Another device which may be coupled to bus 11 is a hard copy device 23 (e.g., a laser printer) for printing data or other information onto a tangible medium. Additionally, a sound recording or voice option 24 can be coupled to the system 10 to provide multimedia capabilities.

Figure 2:
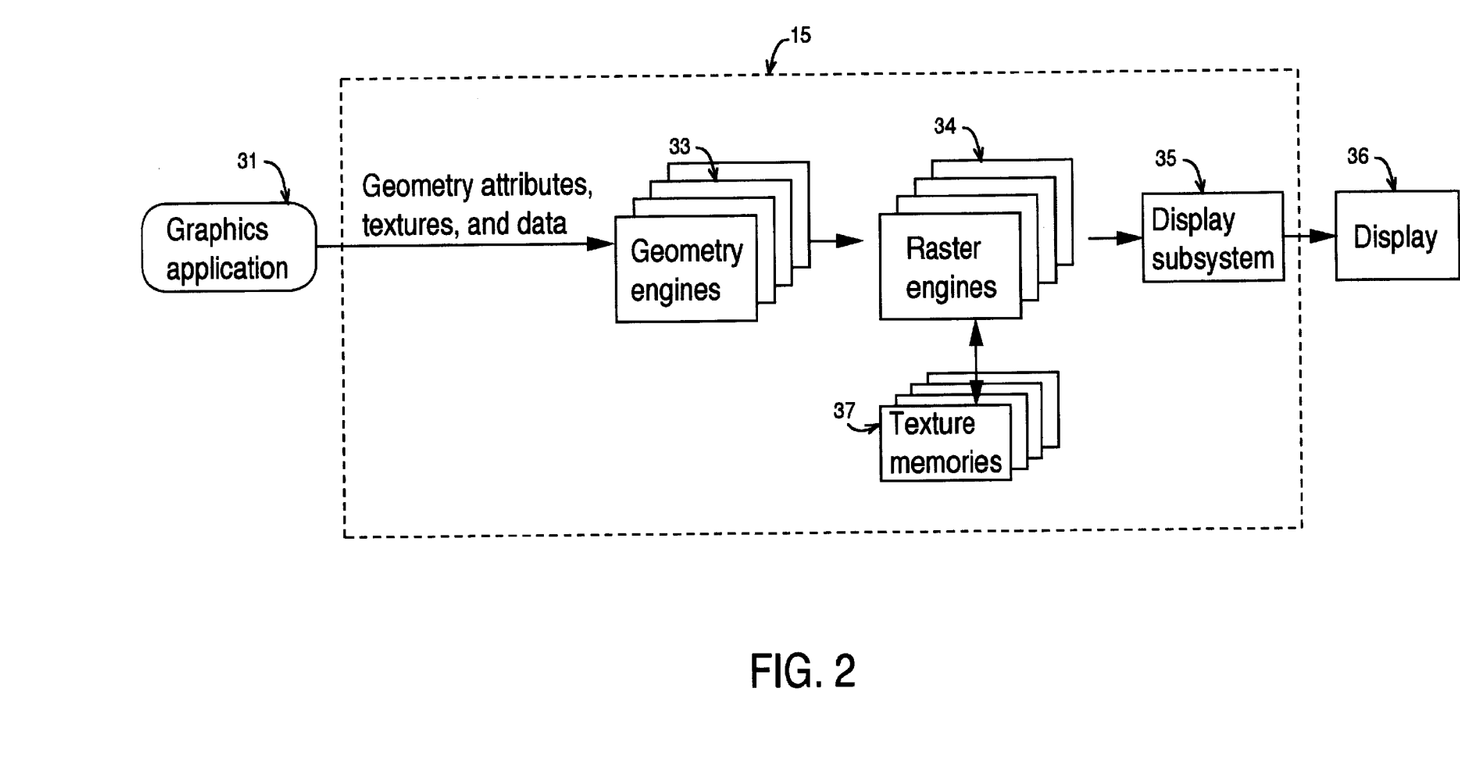
FIG. 2 shows a block diagram of a graphics subsystem in accordance with one embodiment of the present invention.

Referring now to FIG. 2, a block diagram of the rendering process of graphics subsystem 15 in accordance with one embodiment of the present invention is shown. FIG. 2 shows a generalized block diagram of the rendering process as it occurs in the stages of graphics subsystem 15. As depicted in FIG. 2, a graphics application 31 generates information and images for display. In the present embodiment, graphics subsystem 15 is configured for parallel processing. Graphics subsystem 15 includes four parallel geometry engines 33 and four parallel raster engines 34. Raster engines 34 are each coupled to respective texture memories 37. Texture memories 37 function in part by storing texture image information needed for implementing texture mapping.

In typical operation, a graphics application 31 produces graphics data (geometry attributes, textures, data, commands, etc.) which is transferred to the geometry engines 33 of graphics subsystem 15. Graphics application 31 executes on processors 16 of FIG. 1. The geometry engines 33 convert the graphics data into a screen coordinate system. The geometry engines 33 perform projection and transformation processes to give depth to a displayed object. The resulting primitives (points, lines, polygons, polyhedra, and the like) are then supplied to the raster engines 34. The raster engines 34 generate pixel data (e.g., fragments, fragment parameters, color information, and the like) based on these primitives. The raster engines then perform Z-buffering, blending, texturing (using texture data stored in texture memories 37), and antialiasing functions. The resulting pixel values are then sent to a display subsystem 35 for storage (e.g., storage and an included frame buffer). The display subsystem 35 then reads the buffered pixel values, performs gamma correction and other such display-specific sperations, and sends the image to the display 36.

As depicted in FIG. 2, graphics subsystem 15 implements a parallel processing environment, in that the geometry engines 33 and raster engines 34 process data in parallel to speed the rendering process. The adjustable texture replication process of the present invention is implemented within this parallel processing environment. To prevent saturation of the communications pathways between the components (e.g., geometry engines 33, raster engines 34, and texture memories 37) of graphics subsystem 15, the present invention configures raster engines 34 into "clusters" in order to make the texture mapping process more efficient. For example, in this embodiment, graphics system 15 includes four parallel raster engines 34. These four engines and their respective texture memories are configured into a first and second cluster. The clustering process is shown in greater detail in FIG. 3 below.

Figure 3:
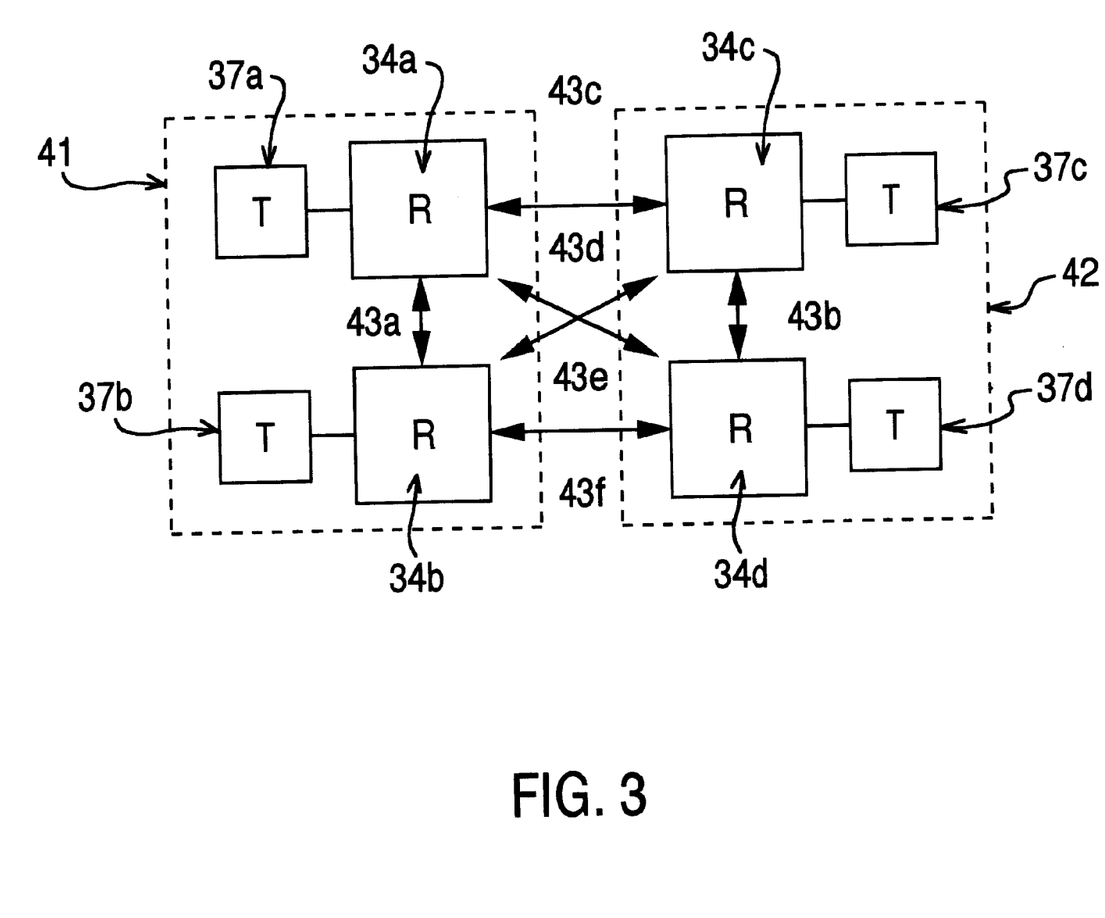
FIG. 3 shows a diagram of a first cluster configuration in accordance with one embodiment of the present invention.

Referring now to FIG. 3, the clustering process present invention is shown. FIG. 3 shows a first cluster 41 and a second cluster 42. The first cluster 41 includes raster engines 34*a* and 34*b*, along with their respective texture memories 37*a* and 37*b*. Similarly, the second cluster 42 includes raster engines 34*c* and 34*d*, along with respective texture memories 37*c* and 37*d*. Clusters 41 and 42 comprise a "supercluster". The communications pathways between the raster engines are shown by arrows 43*a–f*.

In accordance with the present embodiment, a first texture image copy is stored in the texture memories of the first cluster 41 and a second texture image copy is stored in the texture memories of the second cluster 42. In the present embodiment, the texture image is apportioned between the two texture memories of each cluster (e.g., each texture memory having ½ of the texture image). In this manner, a complete copy of the texture image is maintained by each cluster.

During the texture mapping operation, each particular raster engine primarily accesses its respective coupled texture memory. For example, raster engine 34*a* primarily accesses texture memory 37*a* for needed texture data. In those instances where required texture data is not stored in texture memory 37*a*, raster engine 34*a* fetches the required data from texture memory 37*b* via raster engine 34*b*, as shown by line 43*a*. The raster engines of the second cluster 42 function similarly.

In this manner, most of the communications traffic between raster engines occurs "within cluster", meaning that fetches of texture data occur amongst raster engines in the same cluster since each cluster stores a complete texture image copy. This aspect greatly reduces the aggregate amount of communications traffic in comparison to that of a prior art "fully apportioned" texture storage scheme. For example, as depicted in FIG. 3, most of the texture fetches occur via communications pathways 43*a* and 43*b*. This greatly reduces the traffic seen on pathways 43*c–f*.

It should be noted that a complete texture image copy remains readily available within each cluster, without requiring the memory hardware expense associated with prior art "full replication" schemes. Cluster 41 and cluster 42 both store a complete copy of the required texture image (e.g., in texture memories 37*a–b*, and 37*c–d*). This allows raster engines 34a–d to efficiently support the texture mapping of large texture images (e.g., large texels) since two texture memories are used to store a single texture image copy.

Additionally, it should be noted that the clustering process of the present invention requires no permanent hardware changes to graphics subsystem 15. For example, as described above, raster engines 34a–d are configured into two clusters. This configuration is software based, and can be modified as dictated by the requirements of the user. In contrast, prior art texture storage schemes are defined by architecture (e.g., either fully replicated, or fully apportioned) and can not be changed by the user.

Figure 4:
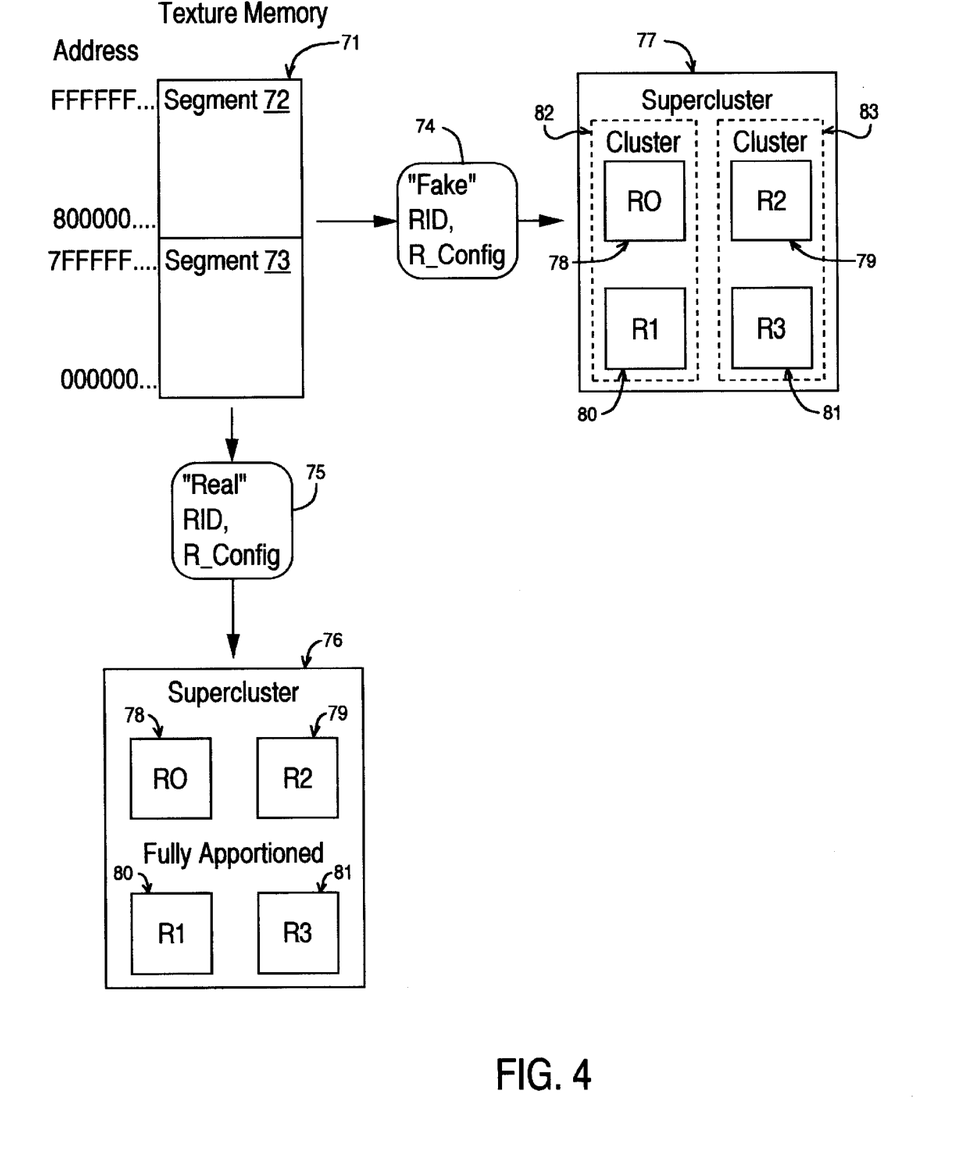
FIG. 4 shows a diagram of a dual-supercluster configuration in accordance with one embodiment of the present invention.

FIG. 4 represents a preferred embodiment, in which part (73) of the total texture memory (71), segment 73, is always allocated to a fully apportioned supercluster 76. Multiple superclusters (e.g., each comprised of one or more clusters of raster engines) may exist simultaneously on the pool of raster engines, as shown in FIG. 7. This is accomplished by dividing the available texture memory into N segments, where there is a one-to-one, onto mapping between the N segments and N superclusters. Always having a fully apportioned segment available simplifies operations like framebuffer-to-texture copies. In the example portrayed in FIG. 4, part (e.g., segment 72) of the texture memory 71 is allocated to supercluster 77, which consists of two clusters 82 and 83. Note that clusters 82 and 83 contain the same rasterizers (rasterizers 78–81) as supercluster 76. The decision of which supercluster topology to use for a given texture is dictated/specified by the texture memory address. It should be noted that in this embodiment, no texture is allowed to span both segments. All textures must lie exclusively in one segment. The remapping is peformed as shown by blocks 74 and 75, using RID and R_config values, which are further discussed in FIG. 6 below.

With refernce again to FIG. 3, in accordance with the present invention, the desired degree of texture image replication is controlled by the user. As described above, the configuration of the clusters is software based, requiring no permanent hardware changes to the graphics subsystem 15. As such, the configuration of the clusters can be controlled by the user in accordance with any particular requirements. For example, in those cases where extremely large textures are manipulated, graphics subsystem 15 can be configured as a "fully apportioned" texture environment, where a single copy of the texture image is apportioned amongst the storage space of each of texture memories 37a–d. Alternatively, for example, in those cases where small textures are manipulated, graphics subsystem 15 can be configured as a "fully replicated" texture environment, where each of texture memories 37a–d store a complete copy of the texture image.

With respect to communications pathways 43a–f, these pathways can be implemented through a number of different physical hardware embodiments. For example, communications pathways 43a–f can be physically implemented using a "cross bar" switch, or another type of packet switched router. As another example, communications pathways 43a–f can be implemented using a high-speed serial or parallel bus (e.g., HPPI, SCSI, PCI, etc.). A block diagram of currently preferred embodiments of a computer system in accordance with the present invention is shown in FIG. 7 below.

The clustering process of present invention is scaleable to support varying degrees of "parallelism". For example, the process of the present invention can readily function with highly parallel rendering subsystems, for example, including 16 or more raster engines. The cluster configuration is controllable by the user. For example, a given 16-way parallel rendering subsystem can be configured into two, four, or eight clusters of eight, four, or two raster engines each. An example of one eight-way configuration is shown in FIG. 5 below.

Figure 5:
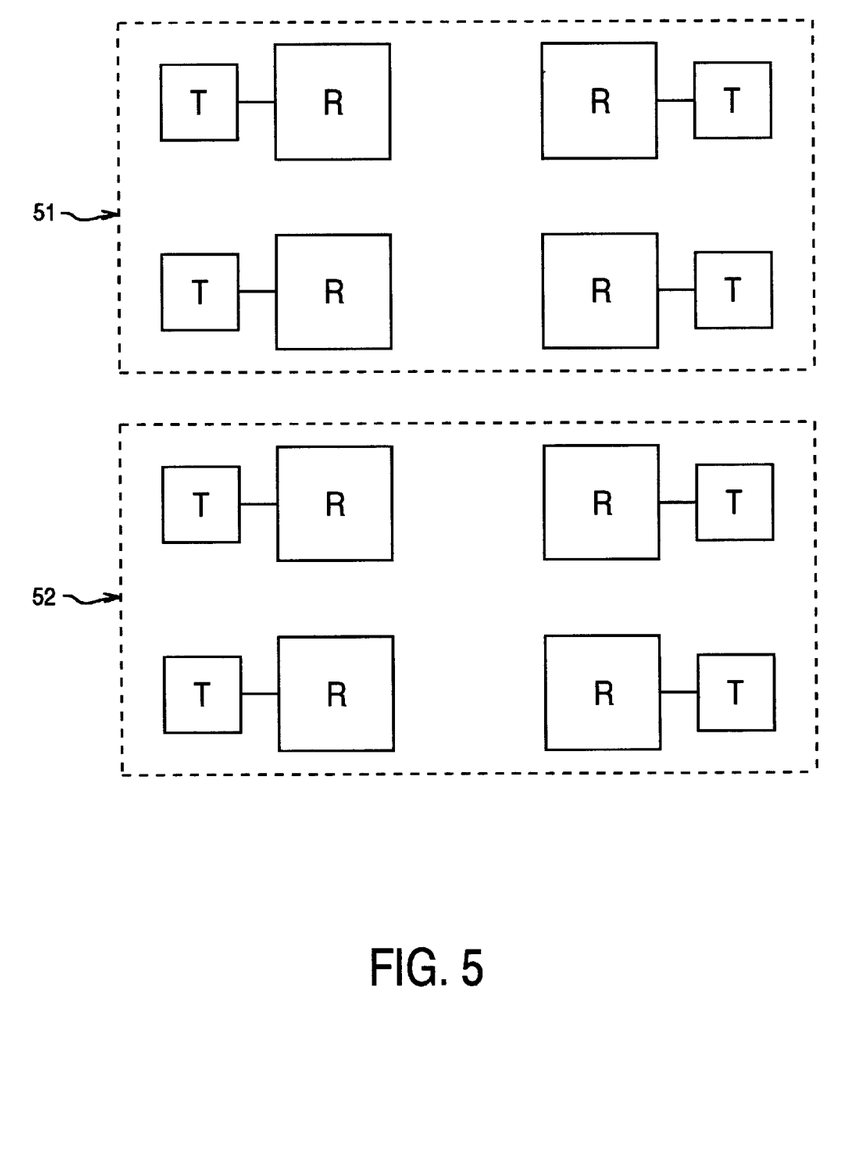
FIG. 5 shows a diagram of a second cluster configuration in accordance with one embodiment of the present invention.

FIG. 5 shows a diagram of an 8-way parallel rendering subsystem configured into two clusters 51 and 52. In this embodiment, cluster 51 and cluster 52 each include four raster engines and their respective four texture memories. As described above, each cluster stores a complete copy of the required texture image (e.g., apportioned among their respective texture memories). As described above, texture data fetches between the raster engines occur within cluster (for purposes of clarity, the communications pathways are not shown).

With respect to specific implementation details (which depend upon the architecture of the computer system in which the present invention is implemented), it should be noted that the geometry subsystem (e.g., geometry engines 33) needs to be configured such that it is aware of the particular cluster configuration selected by the user. For example, in a filly replicated configuration wherein each texture memory includes a complete copy of the texture image, the geometry subsystem needs to be configured to download texel data to each raster engine accordingly.

In one implementation of a fully apportioned graphics system, each geometry and raster engine in the system is aware of the value of an R_CONFIG register, which specifies how many rasterizers are in the system. Additionally, each rasterizer chip has a uniquely set RID register which identifies the particular role of each raster engine. One method of implementing Variable Texture Replication is to have a separate set of R_CONFIG,RID registers in each raster engine. The special cluster (or "fake") registers are used in conjunction with the primary R_CONFIG,RID registers to re-map texture requests and responses between physical addresses and virtual (cluster) addresses. The Cluster R_CONFIG and RID registers would always describe a smaller virtual configuration than the actual physical configuration. (e.g. for the cluster topology described in FIG. 3, the physical R_CONFIG would be a 4R system, but the cluster R_CONFIG would specify a 2R system, because there are two raster engines per cluster). In this implementation, each (non-fully-apportioned) supercluster would have its own pair of R_CONFIG,RID registers. The selection of which set of cluster registers to use for a particular texture request or response is made based upon the memory address of the texels associated with that transaction. The addition of these cluster-specific registers accomplishes the necessary virtual-physical mapping, such that no hardware-based changes need to be made to the basic architecture of graphics subsystem 15.

Figure 6:
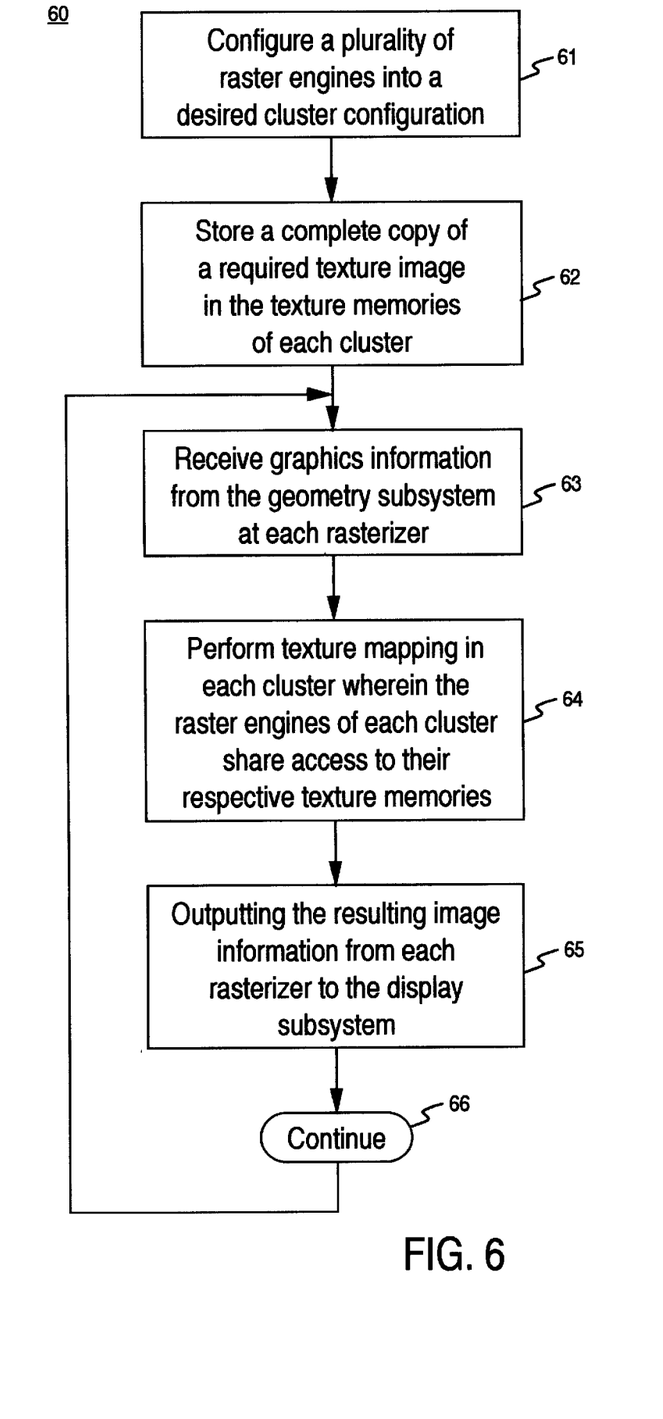
FIG. 6 shows a flow chart of the steps of a process in accordance with one embodiment of the present invention.
Figure 7:
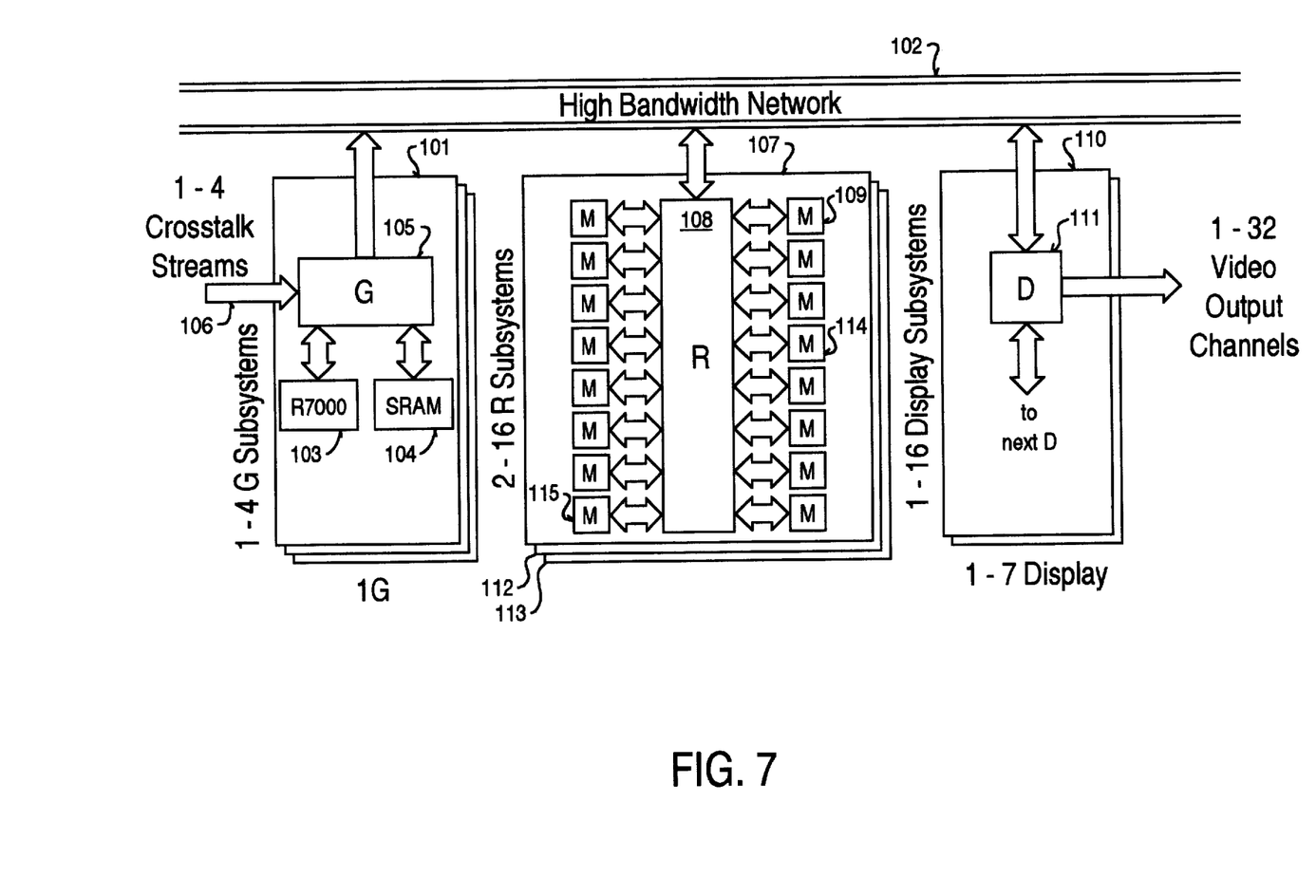
FIG. 7 shows a block diagram of the currently preferred embodiment of a network based computer system according to the present invention.

Referring now to FIG. 6, a flow chart of the steps of a process 60 in accordance with one embodiment of the present invention is shown. As depicted in FIG. 6, process 60 shows the steps of a rendering process of the present invention as implemented in a parallel processing graphics subsystem (e.g., graphics subsystem 15 of FIG. 1).

Process 60 begins in step 61, where a plurality of raster engines in the graphics subsystem are configured into their desired cluster configuration. As described above, the present invention is operable in graphics subsystems having varying degrees of parallelism (e.g., four-way parallel, 16-way, 64-way, etc.). The raster engines are configured into one or more superclusters depending upon the desired degree of texture replication required by the user. As described above, a complete copy of the texture image is stored among the raster engines (e.g. texture memories) within each cluster. In those applications where a higher degree a replication is desired, a larger number of clusters are implemented. Similarly, where less replication is desired, fewer clusters are implemented. In each case, the components of the graphics subsystem are configured to accomplish a re-mapping of the appropriate physical and virtual addresses in accordance with the cluster configuration selected by the user.

In step 62, a complete copy of the required texture image is stored in the texture memories of each cluster. As described above, the texture image is apportioned among the texture memories of the cluster. If multiple superclusters are configured, the application or system software chooses the most appropriate memory segment for the texel size of the textures.

In step 63, the graphics information is received from the geometry subsystem at each rasterizer. As described above, this information includes geometry attributes, textures, and the various data required to perform the rasterization processing (e.g., scan conversion, texture mapping, anti-aliasing, etc.). This is no different from the behavior of a completely replicated or completely apportioned system.

In step 64, texture mapping is performed in each cluster, wherein the raster engines of each cluster share access to their respective memories. As described above, each raster engine primarily fetches texture data from its respective coupled texture memory. Additional needed texture data is fetched from the other texture memories include within the cluster. In this manner the majority of the texture fetch communications traffic occurs within each cluster, providing a greater degree a control with regard to communications bandwidth of the graphics subsystem.

In step 65, the resulting image information for each rasterizer is output to the display subsystem for further processing.

In step 66, process 60 continues, as graphics information is continually received from the geometry subsystem and resulting image information is continually output to the display subsystem.

Referring now to FIG. 7, a block diagram of the currently preferred embodiment of the network based computer system according to the present invention is shown. The network based computer system consists of a very high bandwidth point-to-point network based on a fully-connected topology, onto which a number of nodes are attached. Many different types of networks and protocols can be physically implemented. For example, an Ethernet based network can be used. Alternatively, a network as described in the patent application entitled, "Apparatus and Method For Utilizing Multiple Rendering Pipes For A Single 3-D Display," Ser. No. 09/177,911, assigned to the present assignee, filed on Oct. 23, 1998, and which is incorporated in its entirety herein, can be used in the present invention. Four node types are contemplated: a geometry (G) subsystem, a rasterizer (R) subsystem, a display (D) subsystem, and a network (N) subsystem. One to four G subsystems 101 can be coupled to a high bandwidth network 102. The G subsystems comprise a multiprocessor 103 (e.g., the R7000 RISC microprocessor manufactured by MIPS Technologies), some static random access memory (SRAM) 104, and a geometry ASIC chip 105. The G chip 105 accepts instructions and data from crosstalk streams 106. The instructions are executed by microprocessor 103. G chip 105 performs geometric calculations on vertex data. Data is temporarily cached in SRAM 104. Eventually, the resulting vertex data is sent over the high bandwidth network 102 to one of the R subsystems. Two to sixteen R subsystems 107 are used to perform pixel rasterization functions. R subsystems basically are comprised of a rasterization ASIC chip 108 and multiple memory (M) chips 109. The actual rasterization functions are performed by R chip 108, whereas framebuffer and texture memory is provided by the M chips. The resulting pixel data is then sent over the high bandwidth network 102 to one of the display subsystems 110. One to sixteen display subsystems 110, comprised of a display ASIC chip 111, is used to drive one to thirty-two video output channels. One D chip can also be coupled to another D chip.

Additional details of the currently preferred embodiment of the computer system in accordance with the present invention can be found in "A SCALEABLE NETWORK BASED COMPUTER SYSTEM", by Christopher Migdal et al., Ser. No. 09/218,121, assigned to the present assignee, filed on Dec. 21, 1999, and which is incorporated in its entirety herein.

Thus, the present invention is method and system for variable texture replication in a parallel graphics subsystem. The method and system of the present invention provides a method for efficiently handling large textures (large texels e.g., 64 bits) in a parallel processing environment. The variable texture replication process of the present invention provides a high performance method of supplying texture data to multiple parallel raster engines that does not incur the cost penalties of a full statically replicated texture environment. In addition, the present invention retains the efficiency aspects of apportioned texture storage amongst parallel raster engines and does not incur the data transfer saturation penalties of texture mapping with large textures.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a graphics subsystem of a computer system, a method for texture replication within the graphics subsystem, the method comprising the steps of:
   a) configuring a plurality of raster engines into a first cluster and a second cluster, the raster engines of the first cluster and the raster engines of the second cluster being each communicatively coupled to respective texture memories;
   b) storing a first texture image copy among the texture memories of the first cluster such that each respective texture memory stores a respective portion of the first texture image copy;
   c) storing a second texture image copy among the texture memories of the second cluster such that each respective texture memory stores a respective portion of the second texture image copy; and
   d) performing a parallel texture mapping process on a surface by:

e1) using the first cluster, texture mapping the first texture image copy wherein the plurality of raster engines share access to the each respective memories storing the first texture image copy; and e2) using the second cluster, texture mapping the second texture image copy wherein the plurality of raster engines of the second cluster share access to the each respective memories storing the second image copy, wherein the number of raster engines respectively included in the first cluster and the second cluster are adjustable to implement variable texture replication.

2. The method of claim 1, further including the step of communicatively coupling the plurality of raster engines using a cross bar switch.

3. The method of claim 1, further including the step of configuring the plurality of raster engines into at least the first cluster and the second cluster, wherein the configuration is determined by a user.

4. The method of claim 1, further including the step of configuring the plurality of raster engines into N clusters of at least two raster engines each, N determined by a user.

5. The method of claim 1 further including the step of configuring the raster engines to communicate with a geometry subsystem of the computer system in accordance with the cluster configuration as determined in step a).

6. The method of claim 1 further including the step of configuring the plurality of raster engines to each store a texture image copy in each respective texture memory to implement fully replicated texture image storage.

7. The method of claim 1 further including the step of configuring the plurality of raster engines are configured to each store a respective portion of a texture image copy to implement fully apportioned texture image storage.

8. In a computer system having a graphics subsystem, the graphics subsystem including N raster engines and N respective coupled texture memories configured for parallel processing, a method for texture replication in the N texture memories, the method comprising the steps of:

a) configuring the N raster engines into M clusters of at least two raster engines each, the raster engines of the M clusters being each communicatively coupled to the respective texture memories, M being an adjustable integer number;

b) storing M texture image copies among the texture memories of the M clusters such that each respective texture memory in each m cluster stores a respective portion of the respective m texture image copy; and c) performing a parallel texture mapping process on a surface by texture mapping each m texture image copy onto a surface using each respective m cluster, wherein the raster engines of each m cluster fetch texture data from each respective texture memory of each m cluster, M being adjustable to implement variable texture replication among the N raster engines.

9. The method of claim 8, further including the step of communicatively coupling the N raster engines using a cross bar switch.

10. The method of claim 8, further including the step of adjusting the value of M, the adjusting being determined by a user to control the variable texture replication.

11. The method of claim 8, wherein N is sixteen and M is four, such that each m cluster includes four raster engines and four respective coupled texture memories.

12. The method of claim 8, wherein N is four and M is two, such that each m cluster includes two raster engines and two respective coupled texture memories.

13. The method of claim 8, further including the step of configuring the N raster engines to communicate with a geometry subsystem of the computer system in accordance with the cluster configuration as determined in step a).

14. The method of claim 13, wherein each n raster engine includes a first and second configuration register, the first register operable for configuring the each N raster engines in accordance the M cluster configuration as determined in step a), the second register operable for configuring the each n raster engine in accordance with a position of the each n raster engine within the respective each M cluster.

15. The method of claim 8, further including the step of configuring the N raster engines to each store a texture image copy in each respective texture memory to implement fully replicated texture image storage.

16. The method of claim 8, further including the step of configuring the N raster engines to each store a respective portion of a texture image copy to implement fully apportioned texture image storage.

17. The method of claim 8 further including the step of configuring at least one super cluster that includes a plurality of clusters with its own associated value for M.

18. The method of claim 17 further including the step of allocating a portion of a total amount of texture memory to the super cluster, wherein the portion of texture memory is fully apportioned among the raster engines of the super cluster.

* * * * *

UNITED STATES PATENT AND TRADEMARK OFFICE
CERTIFICATE OF CORRECTION

PATENT NO.   : 6,362,828 B1
DATED        : March 26, 2002
INVENTOR(S)  : David L. Morgan

It is certified that error appears in the above-identified patent and that said Letters Patent is hereby corrected as shown below:

<u>Column 10,</u>
Line 23, after "a" please replace "filly" with -- fully --.

Signed and Sealed this

First Day of October, 2002

Attest:

JAMES E. ROGAN
*Attesting Officer*   *Director of the United States Patent and Trademark Office*